April 17, 1956 R. J. HICKIN ET AL 2,742,182

CARRIER CARTONS

Filed Nov. 18, 1953 5 Sheets-Sheet 1

INVENTORS
Robert J. Hickin
Charles L. Champlin
BY W. H. Finckel Jr.
ATTORNEY

CARRIER CARTONS

Filed Nov. 18, 1953 5 Sheets-Sheet 2

INVENTORS
Robert J. Hickin
Charles L. Champlin
BY W. H. Fincke Jr.
ATTORNEY

CARRIER CARTONS

Filed Nov. 18, 1953 5 Sheets-Sheet 3

INVENTORS
Robert J. Hickin
Charles L. Champlin
BY
W. H. Fincke Jr.
ATTORNEY

INVENTORS
Robert J. Hickin
Charles L. Champlin
BY W. H. Finckel Jr.
ATTORNEY

April 17, 1956 R. J. HICKIN ET AL 2,742,182

CARRIER CARTONS

Filed Nov. 18, 1953 5 Sheets-Sheet 5

INVENTORS
Robert J. Hickin
Charles L. Champlin
by W. H. Finckel Jr.
ATTORNEY

United States Patent Office 2,742,182
Patented Apr. 17, 1956

2,742,182

CARRIER CARTONS

Robert J. Hickin, Seville, and Charles L. Champlin, Rittman, Ohio, assignors to The Ohio Boxboard Company, Rittman, Ohio, a corporation of Ohio Application November 18, 1953, Serial No. 392,974

4 Claims. (Cl. 220—118)

Figures 1, 2:
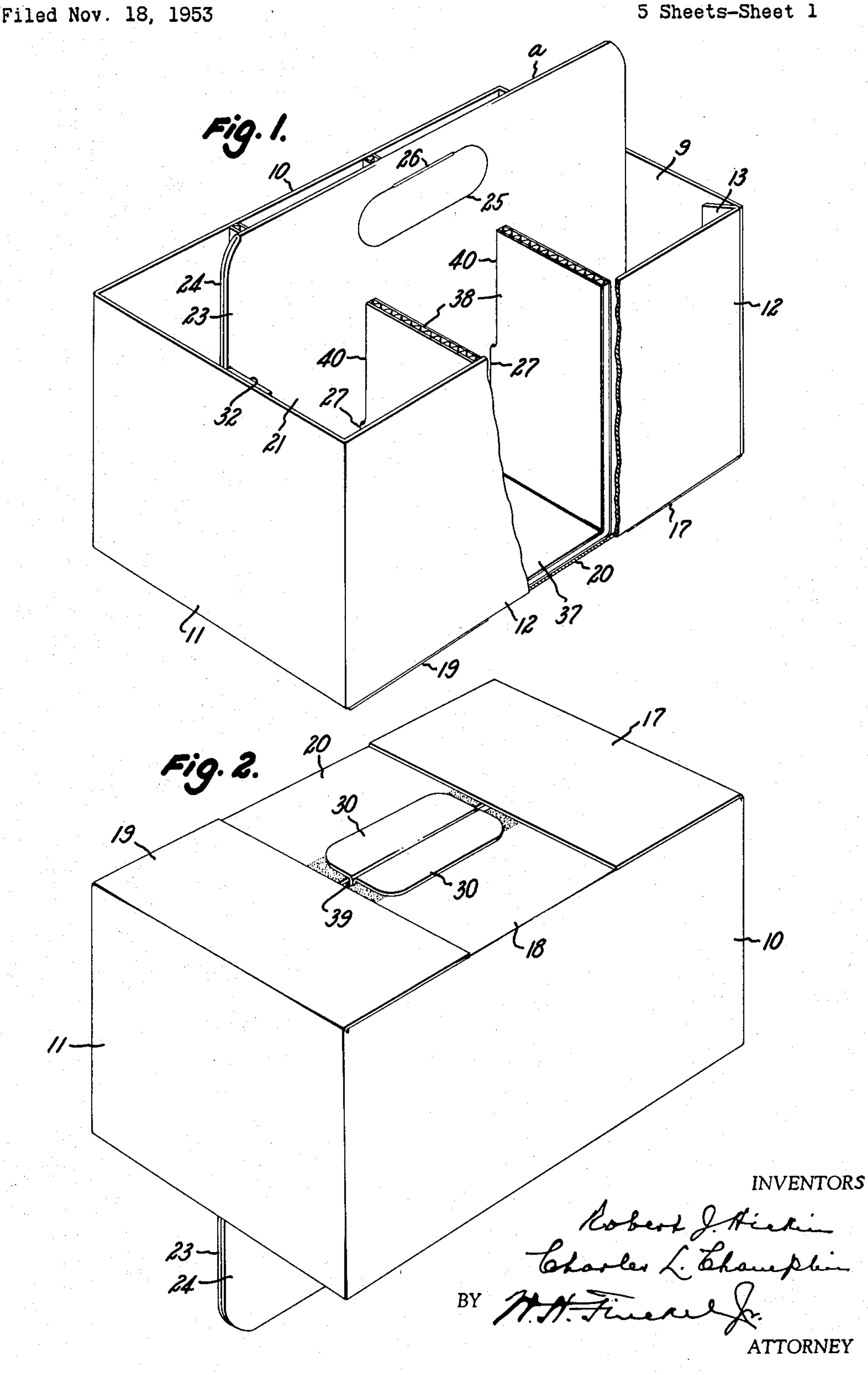

This invention relates to paperboard cartons, and it has particular reference to a carrier carton of flat-foldable type the parts of which may be shipped to the user in flat-folded condition and readily set up and assembled for use.

In accordance with anticipated requirements for the shipment of bottled goods, all paperboard cartons, including carrier cartons of the general type to which this invention is directed, must be provided with elements of corrugated board extending in at least one direction of the carton, and preferably either longitudinally or transversely with respect to the space within the body of the carton into which the bottled goods are introduced and by which they are effectively substantially enclosed for shipment.

One object of the invention is to provide a carton of the carrier carton type which will answer these anticipated shipping requirements while at the same time providing a carton of simple, readily understood, and easily set up form to thus simplify, and make feasible by machinery of relatively simple type, the setting up operations which must normally be performed by the user.

A further object of the invention is to provide a carton of the type referred to in which the consumption of paperboard material, and hence the cost of such material, are reduced to a minimum.

Still another object of the invention is, as hereinbefore mentioned, to provide a carrier carton of such construction that it may be flat-folded for shipment, particularly as respects its body proper, whereby all of the parts of the carton, including such flat-folded body, may be packaged in space saving bundles for shipment to the user.

Still another object of the invention is to provide a carton body in which a combined longitudinal partition element and carrying handle may be permanently associated with the walls of the body and flat-foldable therewith.

A still further object of the invention is to provide a carrier carton having, as just mentioned, a body provided with a combined longitudinal partition member and carrying handle permanently secured to opposite walls of the body, and having transverse partition means, preferably of U-shape having a base or bottom loop and upstanding partition-forming legs, capable of assembly within the body and in interengagement with the longitudinal partition member and retained in such assembly by closure flaps assembled in permanently secured arrangement to close the carton body when it is in set up, article receiving, condition.

A still further object of the invention is to provide a carrier carton of the type last referred to, in which the longitudinal partition member is provided with securing tabs for extension exteriorly of the carton bottom closure members and appropriate attachment thereto, whereby a lifting strain applied to the longitudinal partition member by its handle means will be transmitted from the handle means directly through such partition member to the bottom of the carton. Or these tabs may be attached to the base or loop of the U-shaped transverse partition member and be covered by the bottom closure flaps. Thus, in either mode of attachment, these tabs will, in a marked degree, relieve the side and end walls of the carton of the strains customarily imposed thereon through lifting by known types of combined partition and handle members.

A further object of the invention is to provide the transverse partition member of substantially U-shape, with its loop or base resting upon the bottom closure of the carton and with its sides or legs extending upwardly in cooperating, cell-forming relation to the longitudinal partition member and the side and end wall members of the carton body. Where this U-shaped type of transverse partition member is employed with a longitudinal partition member having securing tabs extending either exteriorly of and secured to the bottom closure means of the carton body or attached to the loop or base of the U-shaped transverse partition member, this loop or base may be provided with a slot extending in alignment with the longitudinal partition member and providing an opening through which such tabs may extend outwardly of the lower end of the carton.

A still further object of the invention is to provide a combined longitudinal partition and handle member which, while fulfilling all of the functions hereinbefore mentioned, may be formed of double thickness of paperboard throughout its full area or merely in those areas subjected to greatest strain or which may be formed of a single thickness of paperboard material.

The body proper of the carton may be made of any appropriate paperboard material customarily used in the production of carrier cartons, but the combined longitudinal partition and handle member is preferably made of a better grade of paperboard material, such, for example, as fiberboard or kraft board, having a strength and rigidity, when fabricated, suitable to fulfill the functions for which it is designed.

In order to comply with the anticipated shipping requirements hereinbefore referred to, the transverse partition means, whether in the form of separate partition elements or of U-shape, will preferably be made of corrugated board.

With these objects in view the invention comprises, in a broad sense, a carrier carton having a body formed from a sheet of appropriate paperboard material provided with cuts and folding scores defining a pair of similar side wall members and a pair of similar end wall members, one of said wall members carrying a glue flap by means of which a "manufacturers' seam" may be formed at one corner of the carton body, and all of the wall members being provided with flaps defined from them by folding scores and serving to produce a bottom closure, a combined longitudinal partition and carrying handle member disposed substantially medially of the carton body and provided with flaps at its end edges for attachment to the end wall members, and transverse partition means associated with the longitudinal partition member and serving therewith to divide the space within the carton body into cell form for the reception of a plurality of bottles or similar containers, the longitudinal partition member preferably being provided at its bottom edge with tab means for extension exteriorly of the bottom opening of the carton and for attachment either to the closure means therefor when they are assembled in bottom forming relation, or to the transverse partition means, and the invention comprises, further, other refinements and details of construction, all as will be explained hereinafter more fully and finally claimed.

Figure 3:
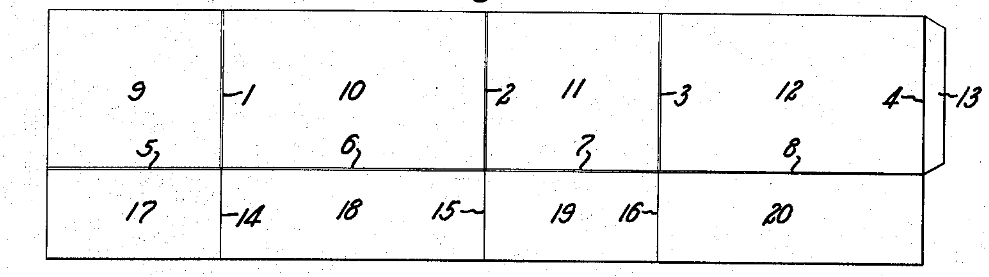
Figure 4:
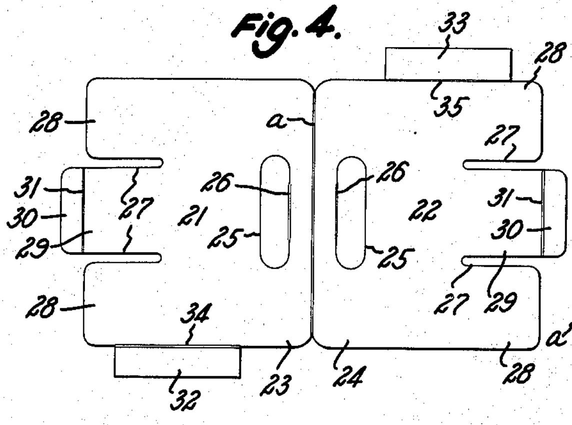
Figure 5:
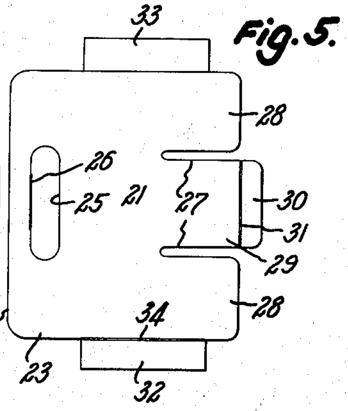
Figure 6:
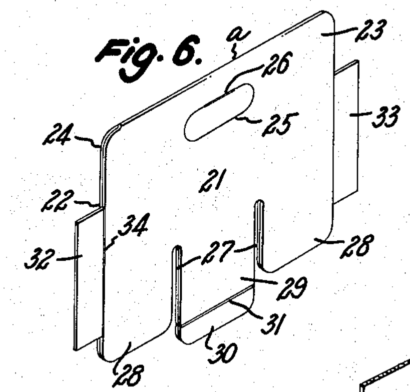
Figure 8:
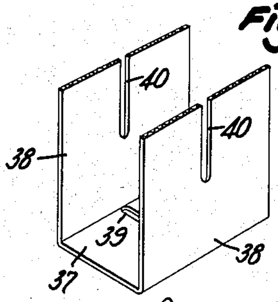
Figure 7:
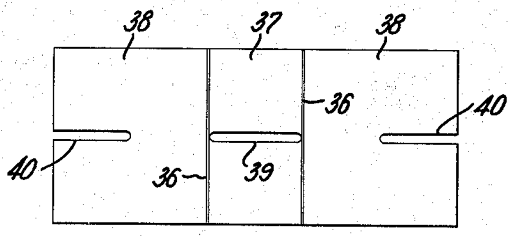
Figure 9:
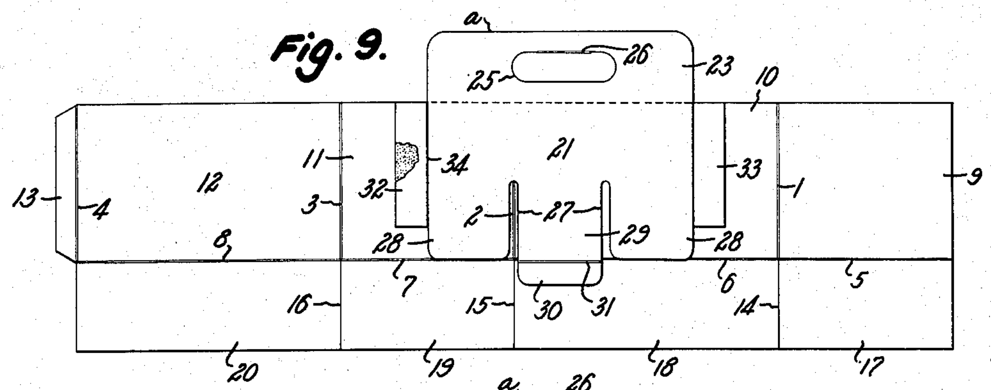
Figure 12:
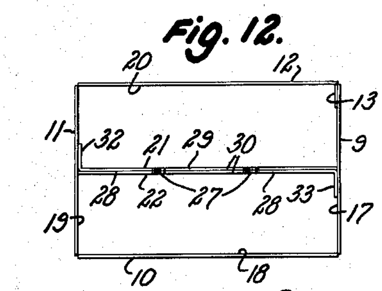
Figure 10:
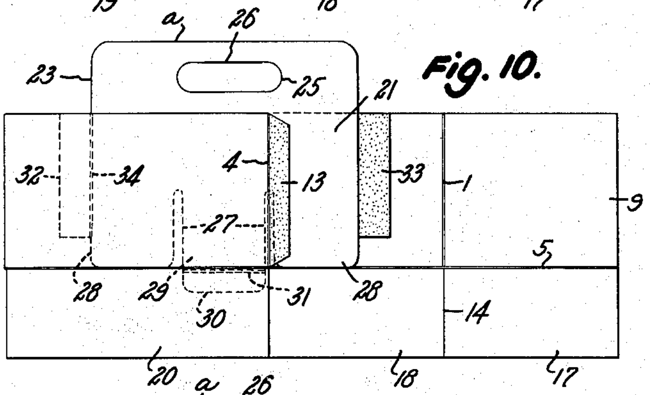
Figure 13:
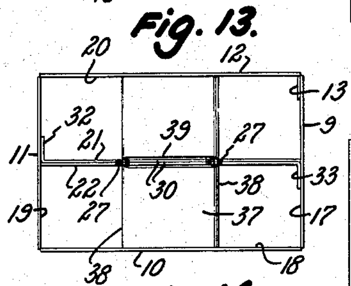
Figure 11:
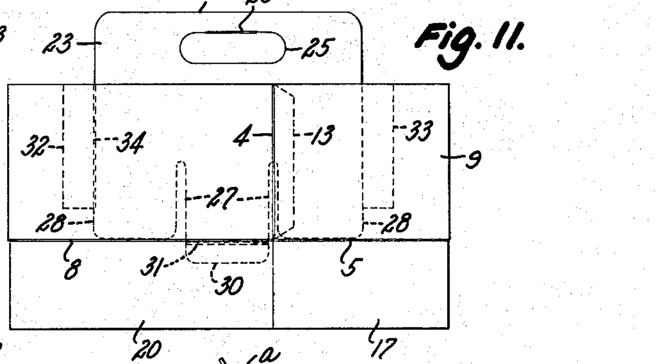
Figure 14:
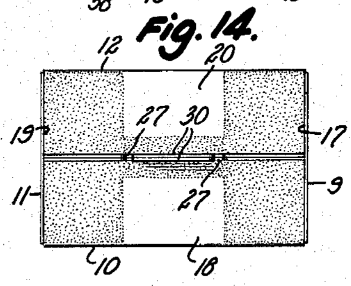
Figure 16:
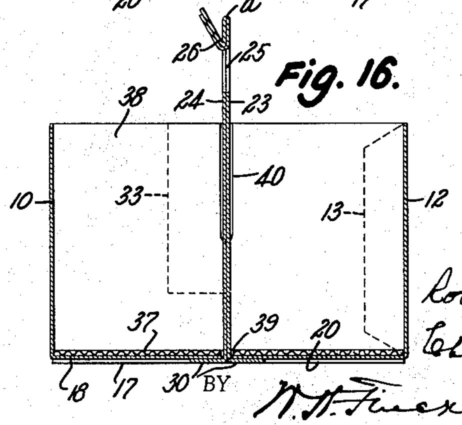
Figure 15:
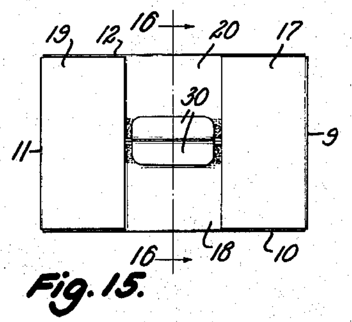
Figure 17:
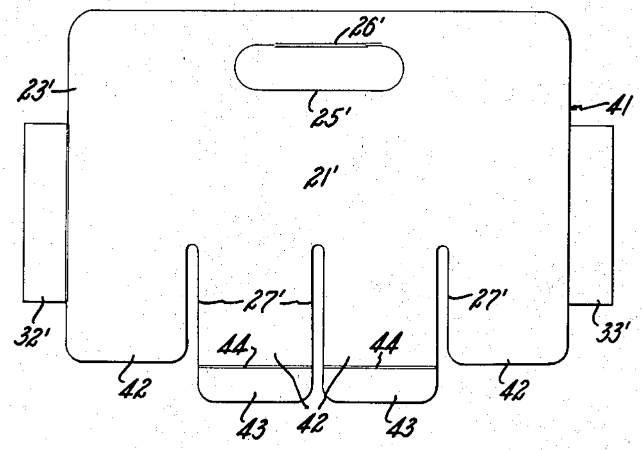
Figure 18:
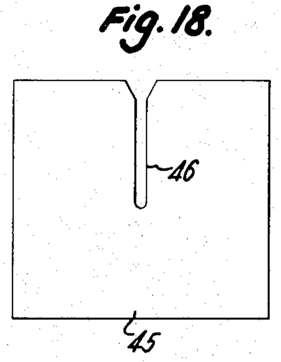
Figure 19:
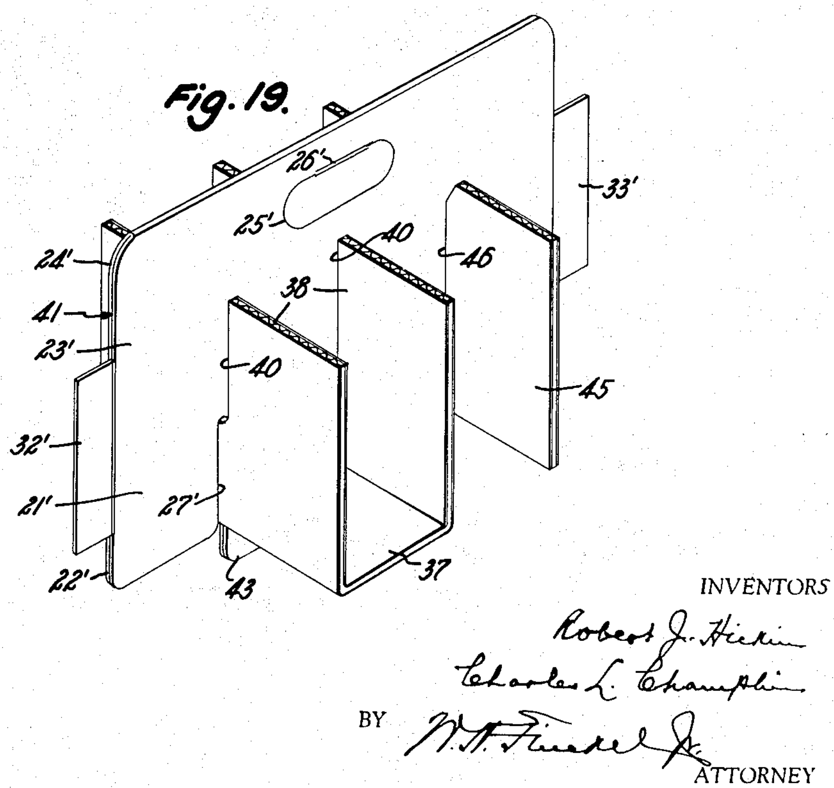
Figure 20:
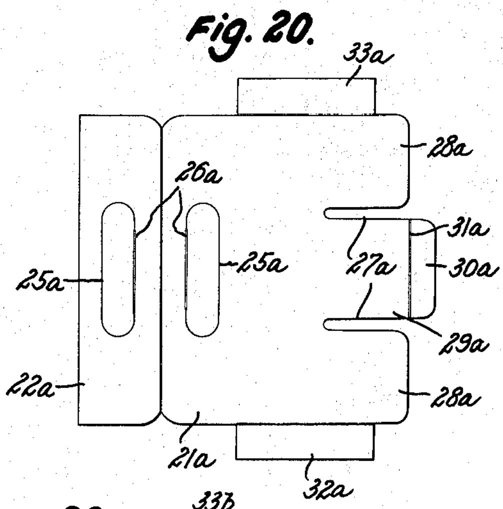
Figure 21:
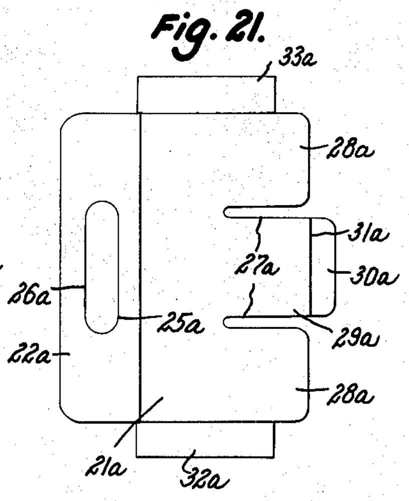
Figures 22, 23, 24, 25, 26, 27:
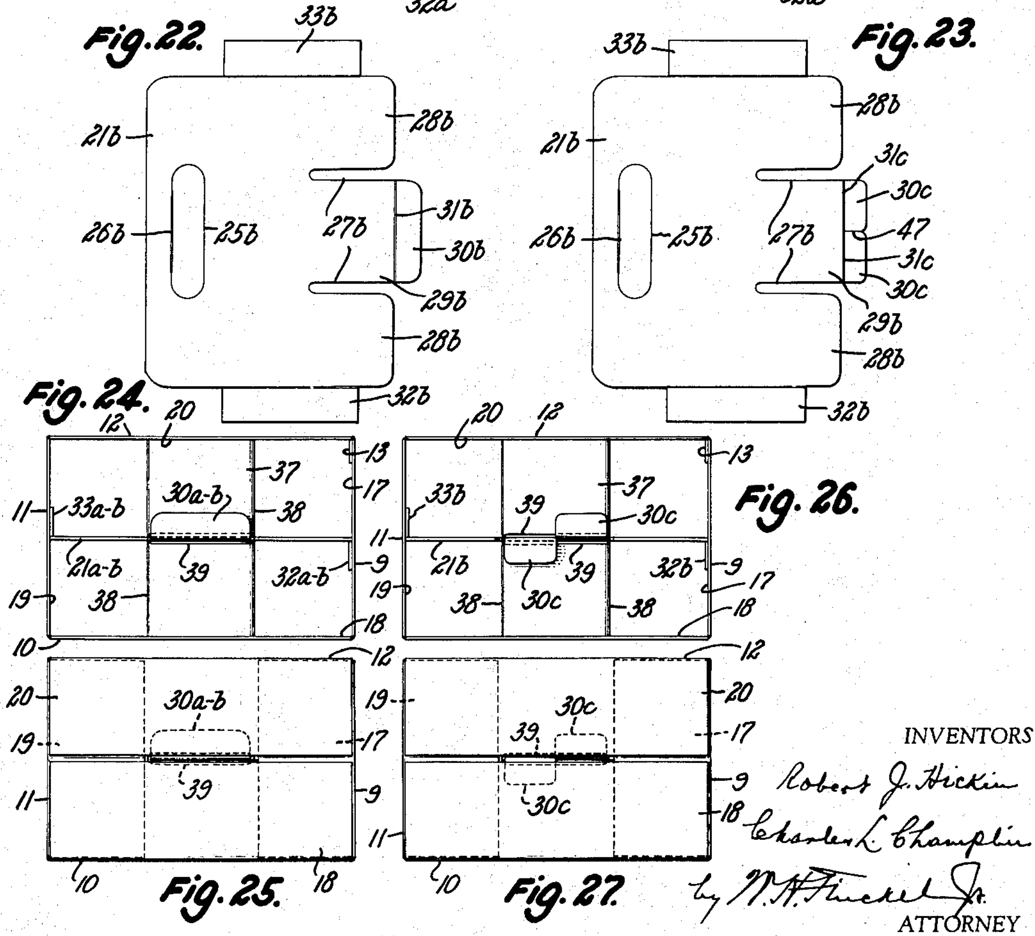

In the accompanying drawings illustrating the invention, in the several figures of which like parts are similarly designated, Fig. 1 is a perspective view looking into the open top of the fully assembled carton, with a portion of the near side wall thereof broken away to disclose the U-shaped transverse partition means, Fig. 2 is a bottom perspective view of the carrier carton in a preferred form of assembly of its parts, Fig. 3 is a plan view of the outer face of the blank for the carton body proper, Fig. 4 is a plan view of one preferred form of blank for formation of the longitudinal partition member, Fig. 5 is a plan view of the finished longitudinal partition member formed from the blank of Fig. 4, Fig. 6 is a perspective view of the longitudinal partition member shown in Fig. 5, Fig. 7 is a plan view of the blank from which the U-shaped transverse partition member is made, Fig. 8 is a view of the transverse partition member folded into usable form from the blank of Fig. 7, Figs. 9 to 15, inclusive, show the various steps of assembling the carton parts illustrated in Figs. 1 to 8, including both those performed by the carton manufacturer and those performed by the user, and in which, Fig. 9 is a plan view of the inner face of the blank for the carton body proper with the longitudinal partition member superimposed thereon and having one of its end flaps adhesively affixed to one of the end wall members, Fig. 10 is a view similar to Fig. 9 but with the left hand side wall member of the body blank folded over upon the longitudinal partition member, and with adhesive applied to its seam-forming flap and to the other end flap of the partition member, Fig. 11 shows the completion of assembly of the carton body proper, and of the longitudinal partition member therewith, by the folding over and adhesive attachment of the opposite end wall member to the seam-forming flap and to the said other end flap of the partition member, Fig. 12 is a bottom view of the carton body and its longitudinal partition member squared up, Fig. 13 is a view similar to Fig. 12, but showing the U-shaped transverse partition member assembled within the carton body, Fig. 14 is a view similar to Fig. 13 but showing the bottom closure flaps of the side walls, with a pattern of adhesive applied thereto, folded inwardly and downwardly over the bottom opening of the body, Fig. 15 is a view similar to Fig. 14 but showing the completion of the operation of assembling the carton, wherein the bottom closure flaps of the end walls and the securing tabs of the longitudinal partition are folded downwardly and secured to the bottom closure flaps of the side walls by means of the adhesive applied to the latter, Fig. 16 is an enlarged transverse sectional elevation of the carton fully set up and ready for use, as taken in the plane of line 16—16, Fig. 15, Fig. 17 is a view similar to Fig. 5 but showing a longitudinal partition member suitable for the provision of a greater number of cells within the carton body, Fig. 18 is a side view of an individual, or separate, type of transverse partition member, as distinguished from the U-shaped partition member illustrated in Figs. 7 and 8, Fig. 19 is a perspective view of the longitudinal partition member shown in Fig. 17 with both U-shaped and individual transverse partition members assembled therewith in an arrangement to provide eight cells in the carrier carton, Fig. 20 is a plan view of a modified blank for forming the longitudinal partition and handle member, Fig. 21 is a plan view of the blank of Fig. 20 folded and secured in finished condition, Fig. 22 is a plan view of a further modification of the longitudinal partition and handle member made from a single thickness of paperboard material, Fig. 23 is a view similar to Fig. 22, but showing a modification of the bottom attaching tabs adapted to the single-thickness member, Fig. 24 is a view similar to Fig. 13 but showing a partition and handle member such, for example, as those illustrated in Figs. 21 and 22, with its single attaching tab secured to the base or loop of the transverse partition member, and it will be apparent that the tabs of the partition member of Figs. 4 to 6 might be similarly secured, Fig. 25 shows the sealing of the bottom closure flaps of the carton body over the flaps of the partition member in the arrangement illustrated in Fig. 24, and Figs. 26 and 27 are views similar to Figs. 24 and 25, but embodying a partition member having its single thickness attaching tab medially divided as illustrated in Fig. 23 to provide two oppositely disposed tabs.

Referring particularly to Fig. 3, it will be seen that the blank for the body proper of the carton comprises a sheet of appropriate paperboard material provided with transverse folding scores, 1, 2, 3, and 4, and a multi-part longitudinal folding score 5—6—7—8, defining, seriatim, an end wall 9, a side wall 10, an end wall 11, a side wall 12, and a glue flap 13. Extending from the longitudinal folding scores, 5, 6, 7, and 8 and separated by cuts 14, 15, and 16 are bottom closure flaps 17, 18, 19, and 20 depending from the end and side wall members 9, 10, 11 and 12, respectively, and foldable relatively thereto upon the folding scores 5, 6, 7, and 8 respectively.

Referring to Figs. 4, 5, and 6, it will be seen that the longitudinal partition member is formed from a blank of paperboard material of appropriate strength and rigidity such, preferably, as fiberboard or Kraft board cut to provide substantially duplicate halves 21 and 22, separated by a folding score *a* and of a length substantially equal to the length of the body side walls 10 and 12 and of a height to provide handle portions 23 and 24, which will extend above the top edges of the side and end walls of the body and are provided with similar cuts 25 and folding scores 26 to form mating hand holes.

When the carton is of the so-called "6-bottle" type the two halves of the longitudinal partition member will be provided with slots 27 dividing it lengthwise into three equal spacer elements 28, 28, and 29, providing the finished partition member with means for interengagement with transverse partition members as will hereinafter appear. The intermediate members 29 are provided with offstanding securing tabs 30 defined by folding scores 31 for the purpose hereinbefore mentioned and as will be explained later in more detail. The two halves of this partition member are provided, respectively, with oppositely offstanding attaching flaps 32 and 33 defined from such halves by folding and hinge scores 34 and 35.

In forming the longitudinal partition element from the blank of Fig. 4, the half 21 is folded over upon the half 22 with adhesive so applied as to cover all areas of their mating surfaces except those embraced within the hand hole forming cuts and scores 25, 26, and the offstanding tabs 30, thus producing a double thickness member, as shown in Figs. 5 and 6, with its flaps 32 and 33 offstanding from opposite ends, its slots 27 in mating relation and its tabs 30 in overlying register with one another, as are also the cuts 25 and scores 26 defining the hand holes.

As will be evident from the short description of Figs. 9 to 11 inclusive, and an inspection of these figures, the combined longitudinal partition and handle member is so assembled with the body blank, during its formation into a tube, as to become, in effect, an integral part thereof and capable of flat-folding with it.

This is accomplished, as set out in the description of the figures of the drawings referred to, by applying adhesive to the under face of the flap 32 of the partition member and laying this member flat upon the body blank with the folding score 34 in alignment with the medial vertical axis of the end wall member 11 (Fig. 9). Then, with adhesive applied to the outer (now-exposed) face of the flap 33, and to the under face of the glue flap 13, the side wall member 12 is folded upon its folding score 3 over and flat upon the partition member (Fig. 10), and thereafter the end wall member 9 is folded upon its folding score 1 flat upon the still-exposed portion of the partition member and upon the glue flap 13 so that it may be caused to adhere to this flap and to the flap 33 of the partition, it being noted that the folding score 35 (Fig. 4) will then be in alignment with the medial vertical axis of the end wall member 9 (Fig. 11).

Thus, the partition member will be attached permanently to the carton body and will lie flat between the juxtaposed portions thereof when the body is in flat-folded condition (Fig. 11). However, when the body is brought to rectangular tube form, by pressure applied to its opposite edge folds, the partition member will automatically assume a position parallel with and midway between the side wall members, and will be relatively rigidly supported in this position by the adhesive attachment of its flaps 32 and 33 to the end wall members 11 and 9, respectively (Figs. 12 and 13).

Obviously, if the glue flap 13 were located at the free end edge of the end wall member 9 instead of at the edge of the side wall member 12, the end wall member 9 would be folded over flat upon the partition member prior to flat folding of the side wall member 12.

It will be understood that the body blanks and partition members of the modifications of Figs. 17, 21, 22, and 23 may be similarly assembled.

Referring to Figs. 7 and 8, it will be seen that the transverse partition member of U-shape is formed from a blank preferably of corrugated board, provided with transverse folding scores 36 so spaced with respect to the longitudinal center of the blank as to provide a loop or base portion 37 of an extent ultimately longitudinally of the carton substantially equal to a single cell, and legs 38 to form the transverse partition members. The portion 37 is provided with a slot 39 arranged longitudinally of the blank for the purpose hereinafter appearing, and each of the partition sections 38 is provided with a slot 40 for interengagement with the slots 27, 27 of the longitudinal partition member. As shown in Fig. 8 the blank of Fig. 7 is folded to appropriate form, with its legs 38 upstanding, by bending upon the folding scores 36.

Referring to Figs. 17 to 19 in which modifications of the longitudinal and transverse partition elements are shown, it will be seen that the longitudinal partition member 41 (Figs. 17 and 19) may be of a length to accommodate a variety of pluralities of cell spaces in excess of the six such spaces for which the longitudinal partition member of Figs. 1, 2, 4 to 6, and 9 to 16 is designed, or it may, conceivably, be designed to accommodate fewer than six such spaces, say four, depending upon the multiples of bottles, or other articles, the user may wish to package in the carrier carton of the invention.

As shown in Figs. 17 and 19, the modified longitudinal partition member 41 will embody the major structural elements of the similar member previously described, including the two similar mating halves 21′ and 22′, with their similar handle extensions 23′ and 24′ having the hand hole forming cuts 25′ and folding scores 26′, and the respective combination attaching and hinging flaps 32′ and 33′. In order to accommodate three transverse partition elements, or more, or fewer, the appropriate number of slots 27′ are provided to define a chosen plurality of spacer elements 42 certain of which, as will best accommodate proper assembly with the parts of the carton body, are provided with offstanding securing tabs 43 defined by folding scores 44.

In place of, or in combination with, the U-shaped transverse partition element of Figs. 7 and 8, plain transverse partition elements 45 (Fig. 18) may be used, the same being of a more or less conventional type including the usual slot 46 for assembly with the slots 27′ of the longitudinal partition member.

As shown in Fig. 19, a combination of the U-shaped and plain transverse partition members may be employed with the longitudinal partition member, or, if desired, or made necessary by the slotting of the longitudinal partition member, the transverse partition members may all be of the plain type of Fig. 18.

As hereinbefore stated, the assembly of the carton body, with the longitudinal partition assembled therewith, is performed by the carton manufacturer, and the thus assembled parts, flat-folded as shown in Fig. 11, are shipped in bundles or packages, along with the flat transverse partition members (Fig. 7 or 18).

From these parts (the bodies with assembled longitudinal partition members, and the transverse partition members, being treated as separate units) the user (packager of bottled goods or the like) can set up the cartons for filling upon automatic machinery, with a minimum of operations, and with great facility, substantially in the following manner.

The body units are arranged in a hopper with their handle members pointing downward and are fed from such hopper, one at a time to a conveyor. As the conveyor advances, the body units are squared up by mechanism which preferably engages their opposite folded edges (ultimately the diagonally opposite edges of the set up body). As the thus squared up body units (Fig. 12) travel with the conveyor with their bottom closure flaps 17, 18, 19 and 20 upstanding in alignment with the respective end and side walls 9, 10, 11 and 12, the U-shaped (or other) transverse partition units are driven by appropriate mechanism into the body units with their slots in register with the slots of the longitudinal partition members so that their loops or bases 37, or lower edges, are substantially in the plane of the folding scores 5, 6, 7, and 8 of the end and side walls of the respective body units (Fig. 13). Obviously, where the U-shaped transverse partition members are used, this driving of them into position will cause the tabs 30 of the longitudinal partition members to emerge through the slots 39 and thus extend upwardly above the bases or loops 37.

As the thus assembled body and partition units advance with the conveyor the closing of the carton bottoms and the completion of the assembling operation is performed as follows: The bottom closure flaps 18 and 20 of the side walls 10 and 12 are plowed outwardly and downwardly into substantially the horizontal plane and are, thus positioned, run over so-called underhead glue pots the glue-applying means of which, such as appropriate rollers, serve to apply to their ultimate outer faces predetermined appropriate patterns of glue, as indicated by the stippled areas of Fig. 14. These bottom closure flaps 18 and 20 are thereafter reversely plowed upwardly, inwardly and downwardly (Fig. 14) so as to overlie the open bottom of the body with their free edges in alignment with, and preferably abutting against, the tabs 30 of the longitudinal partition member. Next, the leading bottom closure flap 17 of the end wall 9 (assuming that travel is to the right in Figs. 12 to 15) is plowed inwardly and downwardly into adhering engagement with the glue applied to the juxtaposed portions of the closure flaps 18 and 20, the tabs 30 of the longitudinal partition member are plowed apart and downwardly into adhering contact with underlying areas of the applied glue, and finally the trailing bottom closure flap 19 of the end wall 11 is kicked over and down upon juxtaposed portions of the glue treated areas of the closure flaps 18 and 20 (Fig. 15). Thereafter, the thus assembled cartons are discharged from the conveyor to compression belt means the bottom belt arrangement of which presents a slot through which the handle means of the longitudinal partition member may extend. The compression exerted by the top belt of the compression means will be absorbed by the bottom belt by way of the transverse partition means. The carrier cartons emerge from the compression belt means in completed form for use with all glued parts properly adhered.

Having reference to Figs. 20 and 21 it will be seen that, if desired, the longitudinal partition and handle member may be of double thickness only in its handle portion, and to this end the part 22*a* will be of such area as to cover, when folded over, only the handle portion of the part 21*a*, with the cuts 25*a* and folding scores 26*a* for the hand hole in register. The partition portion thus being of only single thickness, it will carry both of the hinge flaps 32*a*, 33*a*, and being divided by the slots 27*a* will produce single thickness cell spacer parts 28*a* and 29*a* from the latter of which the single tab 30*a* offstands defined by the folding score 31*a*.

Alternatively, as shown in Figs. 22 and 23, the longitudinal partition and handle member may be of single thickness throughout comprising the member 21*b* with the hand hole forming cuts 25*b* and folding scores 26*b*, and the slots 27*b* providing the cell spacer parts 28*b* and 29*b*, and carrying at its opposite end edges the hinge flaps 32*b* and 33*b*.

As shown in Fig. 22, the tab means 30*b* defined from the part 29*b* by the folding score 31*b* is similar to that of Figs. 20 and 21, but in the modification shown in Fig. 23 it may be medially divided by a cut 47 to produce two similar tabs 30*c* preferably opposite bendable upon the folding scores 31*c*.

Figs. 24 to 27 illustrate a modified manner and sequence of assembling the parts at the bottom closure of the carton, wherein the tab or tabs of the longitudinal partition and handle member are secured to the base or loop 37 of the U-shaped transverse partition member instead of the bottom closure flaps 18 and 20 of the body side walls as in Figs. 2, 15 and 16.

Although in Figs. 24 and 25 a partition and handle member having only one tab 30*a* or 30*b*, as in Figs. 21 and 22, is shown, it will be understood that the partition member of Figs. 5 and 6 might be similarly assembled.

In Figs. 26 and 27 the partition member of Fig. 23, having the two oppositely disposable half tabs 30*c* is shown.

It will be understood, moreover, that the partition members of Figs. 21, 22 and 23 are adaptable to the assembly method and sequence illustrated in Figs. 12 to 15.

The method of assembly, and the sequence of steps therein, where the tabs of the combined longitudinal partition and handle member are secured to the loop or base 37 of the U-shaped transverse partition member rather than to the end closure flaps 18 and 20 of the side walls, is preferably as follows. Instead of squaring up the carton body with its bottom end up, as described in connection with Figs. 12 to 15, the carton body will be squared up with its bottom down, its side wall end closure flaps 18 and 20 bent outward upon their folding scores 6 and 8, and the body supported by the thus positioned flaps resting upon a conveyor so formed as to accommodate appropriate underhead glue pots and a plow and kicker segments for the leading and trailing end closure flaps 17 and 19 of the end walls 9 and 11, these flaps initially being permitted to extend downwardly in alignment with their respective end walls. Also, the conveyor is formed to permit, initially, downward projection of the attaching tab or tabs 30, 30*a*, 30*b*, or 30*c* of the longitudinal partition member.

As the squared up carton is carried along by the conveyor, assuming that it is travelling to the right, Figs. 24 to 27, first the leading end closure flap 17 will be plowed inwardly and upwardly, and the trailing end closure flap 19 will be kicked inwardly and upwardly, so that both of these flaps will lie in carton closing position and be thus held by platform or guide means disposed in the conveyor. Next, glue will be applied to the inwardly and upwardly folded end closure flaps 17 and 19, and to the bottom or outer surface of the base or loop 37 of the U-shaped transverse partition, the wheel of the glue pot preferably being slotted to permit the bottom tabs of the partition member to pass through it. Next, the bottom tab or tabs 30 etc. of the partition will be plowed outward over the base or loop 37 of the U-shaped transverse partition member and into contact with the adhesive thereon, and thereafter, those parts of the conveyor which had supported the end closure flaps 18 and 20 of the side walls will terminate, and these flaps will be plowed inwardly and upwardly into contact with the adhesive covered surfaces of the end closure flaps 17 and 19 and the base or loop 37 of the U-shaped transverse partition member, and the carton will then be run between pressure belts, as hereinbefore described, so that the end closure flaps and the tabs of the longitudinal partition member will be properly adhered to the underlying parts by providing a suitable setting time for the adhesive.

It will be apparent that this mode of assembly, and substantially the same sequence of operative steps therein, may be performed where the tabs 30 etc. of the longitudinal partition member are secured to the end closure flaps 18 and 20 of the side walls of the body. Where this is the case, the end closure flaps 17 and 19 of the end walls of the body will be plowed and kicked in respectively, but after the parts which support the end closure flaps 18 and 20 of the side walls have terminated, these flaps will travel over underhead glue pots, the bottom tabs 30 etc. of the longitudinal handle member meanwhile having been plowed outward and upward against the face of the base or loop 37 of the U-shaped transverse partition member when it is used, and then the end closure flaps 18 and 20 will be plowed inwardly and upwardly so that the adhesive which has been applied to them will cause them to adhere to the underlying closure flaps 17 and 19, to the exposed faces of the tabs 30 etc. of the longitudinal partition member, and to the base or loop 37 of the transverse partition member, when it is used.

By this procedure, a somewhat different arrangement of the parts is obtained from that illustrated in Figs. 2 and 15, in that the end closure flaps 18 and 20 of the side walls of the body are arranged exteriorly of the end closure flaps 17 and 19 of the end walls and also exteriorly of the tabs 30 etc. of the longitudinal partition member.

From the foregoing it will be seen that the carrier carton of the invention in its preferred form, Figs. 1 to 16, and 20 to 27 comprises only three parts, namely, the body proper, the combination longitudinal partition and handle member, and the U-shaped transverse partition member, and that as supplied to the user it is in only two readily assembled units due to the manufacturer's union of the combination longitudinal partition and handle member with the body proper.

Moreover, the several elements of the carton are of such simple design that a minimum of paperboard stock and fabrication operations are required for their production, thus materially limiting manufacturing cost.

Furthermore, the simplicity of the two units (body proper with attached combination longitudinal partition and handle member, and transverse partition member) as supplied to the user( the manufacturer's customer), makes their setting-up and assembly of an obvious nature and capable of performance upon machinery and by handling operations with which he is familiar.

Various changes and modifications are considered to be within the principle of the invention and the scope of the following claims.

What is claimed is:

1. In a carrier carton, a body including a pair of similar side wall members and a pair of similar end wall members all in interconnected relation and adapted to provide a rectangular carton body and defined from each other by folding scores providing the four corner edges of the body, flap means projecting from and foldable relatively to said wall members for providing a bottom closure for said body, and a longitudinal partition member of a length substantially coextensive with the side wall members and arranged substantially medially of the end wall members and having flap means secured to said end wall members and providing hinge connections therewith whereby said body with the thus secured partition member may be flat-foldable with the partition member intermediate its folds, said partition member being provided on its edge adjacent to the carton bottom with offstanding tab means adapted to extend in cooperative relation to the bottom closure forming flaps when such flaps are folded into closure forming position, and said tab means being foldable for contact with and attachment to certain of said bottom closure flaps when the carton is in erected rectangular condition.

2. A carrier carton as claimed in claim 1, in which said partition member is provided with means forming a carrying handle, and the tab means of the partition member are attached to said bottom closure means exteriorly thereof so that when a lifting force is applied to said handle forming means the partition member will transmit said force to the bottom closure means through the tab means of the partition member attached thereto.

3. In a carrier carton, a body including a pair of similar side wall members and a pair of similar end wall members, flap means carried by certain of said wall members and providing a bottom closure for said body, a longitudinal partition member of a length substantially coextensive with the side wall members and arranged substantially medially of the end wall members and provided with means for its attachment to said end wall members, and a U-shaped transverse partition member spaced from said end wall members and having the outer face of its loop in a plane substantially coincident with the bottom edges of the side wall members, said longitudinal partition member being provided at its carton bottom adjacent edge with securing tab means and the loop of said U-shaped transverse partition member being provided with a slot through which said tab means may be projected, said tab means being laterally outwardly foldable relatively to said slot for attachment to said bottom closure flap means.

4. A carrier carton as claimed in claim 3, in which the tab means are attached to the loop of said U-shaped partition member, and said bottom closure means are disposed exteriorly of said tab means.

References Cited in the file of this patent

UNITED STATES PATENTS

| | | |
|---|---|---|
| 2,324,757 | Botley | July 20, 1943 |
| 2,327,529 | Kieckhefer et al. | Aug. 24, 1943 |
| 2,460,530 | Petyak | Feb. 1, 1949 |
| 2,580,333 | Thomas | Dec. 25, 1951 |
| 2,665,049 | George | Jan. 5, 1954 |
| 2,706,935 | Pasjack | Apr. 26, 1955 |

FOREIGN PATENTS

| | | |
|---|---|---|
| 553,311 | Great Britain | May 17, 1943 |